Patented Aug. 13, 1929.

1,724,626

UNITED STATES PATENT OFFICE.

SANKICHI TAKEI, OF TOKYO, JAPAN, ASSIGNOR TO ZAIDAN HOJIN RIKAGAKU KENKYUJO, OF TOKYO, JAPAN.

PROCESS FOR PRODUCING A LIQUID INSECTICIDE CONTAINING EFFECTIVE INGREDIENT OF DERRIS SPECIES.

No Drawing. Application filed August 31, 1925, Serial No. 53,743, and in Japan September 8, 1924.

This invention relates to a process for producing a liquid insecticide containing the effective ingredient of derris species, comprising a step of preparing a primary reagent in which the effective ingredient is mixed with a body of one or more kinds of oils, fats, waxes, resins, higher alcohols, higher hydrocarbons, higher fatty-acids etc. which are entirely free from water and alkali, and a step of preparing a secondary reagent in which the primary reagent is mixed as a colloidal solution.

The object of the invention is to obtain a liquid insecticide in simple and easy manner which is readily applicable and in which effective ingredient is entirely stable after it is preserved or stored for a long time.

It is of public knowledge that the juice obtained from raw root of derris, which is mainly found in Polynesian and sub-Polynesian localities, is diluted with water to use it as an agricultural insecticide. It is also well known that alcohol extract of its dried root, is diluted with soap water to use it for the same purpose. Recently, as well known, the principal ingredient is mixed with soap powder for sale. However, the principal ingredient of derris, i. e. rotenon, loses the insecticidal effect when it contacts with water for a time. Accordingly, when considering the alcohol extracts of the root of derris species, the effective properties of the ingredient must be altered when the extract is preserved for a long time in the market, because a trace of water is, as a rule contained in alcohol. The defect may be eliminated by use of absolute alcohol instead of industrial alcohol, but this is impracticable in point of view of economy because absolute alcohol is costly. Further the inventor found the fact that the effective ingredient is very unstable against alkali as well as water. Therefore, when considering the mixture of the ingredient with soap powder, the effective property of the ingredient is not only altered more or less by presence of moisture and free alkali in soap, but also there is a defect that the ingredient hardly recovers its minutely colloidal state when mixed with water in use.

The inventor has turned his attention to the fact that the poor qualities of rotenon in the known insecticides on the market, must be attributed to the combined action of alkali and water. He has tried, in his research, to mix the rotenon with a body which is insoluble in water or an aqueous solution and is entirely free from water and alkali, at the same time being cheap and economical for practical use. Thus, a superior new process has resulted as follows.

A substance containing rotenon is first mixed with one or more kinds of oils, fats, waxes, resins, higher hydrocarbons, higher alcohols, higher fatty-acids which are entirely free from water and alkali to form a stable preservative mixture and this mixture is mixed with colloidal aqueous solution such as soap water in use.

Said oils, fats etc. do not alter the property of the mixture or reagent of the first step when it is preserved for a long time as they are entirely free from water and alkali and also serve for good bodies. Although mere rotenon can not be popularly used because it is poisonous and is hardly distributed in water or aqueous solutions, the mixture of the first step is efficiently distributed in colloidal aqueous solution.

Said substance containing rotenon means any one of pure or impure substances obtained from raw root of derris species, solutions of the substances of one or more of solvents such as methyl alcohol, ethyl-alcohol, ether, petroleum ether, chloroform, tetrachloride of carbon, and extracts of root of derris with such solvents. The oils mean all kinds of animal oils such as sardine oil, herring oil, cod liver oil, shark oil, chrysalis oil and all kinds of vegetable oils such as cocoa-nut oil, bean oil, rape-seed oil, castor oil, etc. The fatty oils mean all kinds of animal fats such as lard, beef tallow, animal hard oil and vegetable hard oil. The waxes mean wood wax, bees wax etc., while resins include pine resin, copal etc. The higher hydrocarbons mean paraffin etc., while higher alcohol includes glycerine etc. These are properly selected respectively in use. The composition of these substances may be properly selected according to actual case. Colloidal aqueous solution includes solution of soap, glue, egg-albumin, bean milk, devtrine, starch, bengal isinglass, animal albumin, etc. Sometimes, said aqueous solution is added with a little quantity of methyl alcohol, ethyl-alcohol, chloroform, ether, camphor oil, lemon oil, and other solvents. Said additional substances are sometimes used after they are changed into anhydrous or inactive ones which are to be mixed with the body. Ordinary water can be also employed in place of colloidal aqueous solution.

Examples.

I. A solution of 10 litres of ether added to 10 grammes of rotenon, is mixed with a mixture of 400 grammes of fish oil with 40 grammes of hard oil. After sufficiently agitated, all or the greater part of the ether is recovered by evaporation and condensation and thereby a semi-solid mixture is obtained as a primary material. 500 grammes of soap are mixed with 100 kilo-grammes of water to prepare a colloidal aqueous solution as a secondary material. In use, the primary reagent is mixed with the colloidal ecqueous solution and it may be suitably diluted with addition of 100 kilo-grammes of water when used as insecticide. The colloidal solution or secondary reagent may be prepared at any time by users.

II. 10 litres of ether are added to 1 kilo-gramme of the derris root. After four days, the extract is added to 400 grammes of chrysalic oil and 100 grammes of lard. After evaporating ether, semi-solid substance is obtained as a primary reagent. The preparation of the secondary reagent is same to that of the Example I.

III. 20 litres of petroleum ether are added to 1 kilo-gramme of derris root. After four days, the extract is added to 200 grammes of bees wax and 50 grammes of pine resin. After solution, the larger portion of the petroleum ether is recovered by evaporation and condensation and thereby the semi-colloidal material is obtained as the primary material or reagent. The secondary reagent may be prepared by adding a colloidal solution in which 200 grammes of soap are dissolved in 100 kilo-grammes of water.

I claim:

1. The process of producing a liquid insecticide containing the effective ingredient of the derris specie which comprises extracting raw material containing the aforesaid ingredient with a volatile organic solvent therefor, mixing the extract with an anhydrous alkali-free organic preservative for the ingredient, evaporating the solvent from the mixture and mixing the resulting product with an organic colloidal material in an aqueous medium.

2. The process of producing a liquid insecticide containing the effective ingredient of the derris specie which comprises extracting raw material containing the aforesaid ingredient with a volatile organic solvent therefor, mixing the extract with an anhydrous alkali-free fatty material, evaporating the solvent from the mixture and mixing the resulting product with an organic colloidal material in an aqueous medium.

3. The process of producing a liquid insecticide containing the effective ingredient of the derris specie which comprises extracting raw material containing the aforesaid ingredient with a volatile organic solvent therefor, mixing the extract with an anhydrous alkali-free fatty material, evaporating the solvent from the mixture and mixing the resulting product with an aqueous soap solution.

In testimony whereof I affix my signature.

SANKICHI TAKEI.